United States Patent
Danley et al.

(10) Patent No.: US 7,216,512 B2
(45) Date of Patent: May 15, 2007

(54) METHOD OF MAKING AN OPTICAL FIBER BY LASER CLEAVING

(75) Inventors: Jeff D. Danley, Denver, NC (US); T. Brian Wacaster, Hickory, NC (US); Joel C. Rosson, Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 670 days.

(21) Appl. No.: 10/698,220

(22) Filed: Oct. 31, 2003

(65) Prior Publication Data

US 2005/0094945 A1    May 5, 2005

(51) Int. Cl.
*C03B 37/16* (2006.01)
*G02B 6/36* (2006.01)

(52) U.S. Cl. .............. 65/392; 65/433; 65/441; 65/112; 219/121.72; 219/121.82; 219/121.85

(58) Field of Classification Search ............ 65/392, 65/425, 433, 441, 112; 385/83, 88; 219/121.72, 219/121.82, 121.85
See application file for complete search history.

(56) References Cited

U.S. PATENT DOCUMENTS

| | | | |
|---|---|---|---|
| 4,510,005 A | 4/1985 | Nijman | 156/221 |
| 4,932,989 A | 6/1990 | Presby | 65/2 |
| 5,421,928 A | 6/1995 | Knecht et al. | 156/153 |
| 5,983,676 A | 11/1999 | Brown | 65/536 |
| 6,139,196 A | 10/2000 | Feth et al. | 385/97 |
| 6,246,026 B1 | 6/2001 | Vergeest | 219/121.72 |
| 6,413,450 B1 | 7/2002 | Mays, Jr. | 264/1.27 |
| 6,534,741 B2 * | 3/2003 | Presby | 219/121.69 |
| 6,774,341 B2 * | 8/2004 | Ohta | 219/121.72 |
| 2002/0159717 A1 | 10/2002 | Miyake et al. | |
| 2002/0175151 A1 | 11/2002 | Ohta et al. | |
| 2003/0152333 A1 | 8/2003 | Gilligan | |
| 2006/0147157 A1 * | 7/2006 | Manning et al. | 385/78 |

FOREIGN PATENT DOCUMENTS

| | | |
|---|---|---|
| EP | 0987570 A1 | 3/2000 |
| WO | WO02/34452 A1 | 5/2002 |
| WO | WO03/056372 A1 | 7/2003 |

* cited by examiner

*Primary Examiner*—Eric Hug
*Assistant Examiner*—Carlos Lopez
(74) *Attorney, Agent, or Firm*—Jeffrey S. Bernard

(57) ABSTRACT

A field-installable connector includes a connector housing and a ferrule having front and rear opposed faces and at least one fiber bore defined longitudinally therethrough. A laser processed stub optical fiber is disposed within the one fiber bore of the ferrule and extends a predetermined distance beyond the rear face of the ferrule. An alignment feature is operable for self-centering the stub optical fiber and a field optical fiber to perform a mechanical splice using a camming means. A method of laser processing a stub optical fiber includes rotating the stub optical fiber and sweeping a laser beam directed at a desired angle back and forth across a surface of the optical fiber. An oscillating motion of the laser is driven by an intermittent sinusoidal signal that results in two deposits of energy onto the stub optical fiber followed by a cooling period before subsequent deposits of energy occur.

12 Claims, 5 Drawing Sheets

METHOD OF MAKING AN OPTICAL FIBER BY LASER CLEAVING

BACKGROUND OF THE INVENTION

1. Field of the Invention

The present invention relates generally to a connector used in optical fiber mechanical splicing and, more particularly, to a field-installable connector including a stub optical fiber having a laser shaped endface.

2. Description of the Related Art

Optical fibers are used for a variety of applications including voice communication, data transmission and the like. With the ever increasing and varied use of optical fibers, it is apparent that more efficient methods of splicing optical fibers are required. In order to effectively couple the signals transmitted between respective optical fibers, the method of splicing the optical fibers must not significantly attenuate, reduce or alter the transmitted signals. Currently, there are two common methods for splicing optical fibers: fusion splicing and mechanical splicing. Mechanical splicing, the method employed in the present invention, is a process for mating the ends of a pair of optical fibers in which the ends are brought into physical contact with each other and held in place by a mechanical force, such as a "cam" locking mechanism, a spring or a crimp.

Conventional mechanical splicing methods typically involve filling any gap between the endfaces of the fibers, referred to herein as a "core gap," with a refractive index-matching gel. The gel acts as a medium that aids in the transfer of light between a pair of optical fibers, such as a field optical fiber and the stub optical fiber of a field-installable connector. Even though mechanical splices generally provide acceptable signal transmission characteristics, a mechanical splice can refract and/or disperse a portion of the transmitted signal so as to produce a corresponding return loss. The refractance and/or dispersion is/are due, at least in part, to differences between the respective indices of refraction of the cores of the field optical fiber and the stub optical fiber stub, and the index of refraction of the air in the core gap. The index of refraction of the index-matching gel is selected to match the indices of refraction of the cores of the fibers, and thereby reduce or eliminate the difference between the indices of refraction of the cores of the fibers and the core gap.

To create a conventional mechanical splice, the ends of two optical fibers are typically cleaved and inserted into a mechanical splice assembly having precision fiber alignment features, such as machined or etched "V-grooves" extending longitudinally through the assembly. The number of V-grooves and their respective dimensions are of a size to permit the fibers to rest securely within the assembly. The fibers are cleaved using a mechanical cleaver that produces a substantially flat fiber endface essentially perpendicular to the longitudinal axis of the fiber. Mechanical cleaves/cleavers suffer from several disadvantages. First, mechanical cleaves have an inherent glass defect zone that is a result of the mechanical blade striking the glass fiber. Second, mechanical cleavers typically produce sharp edges between the cleaved endface and the outer diameter of the fiber. This sharp edge can skive the V-grooves of the mechanical splice assembly. Third, mechanical cleavers typically produce substantially flat fiber endfaces with cleave angles that may not be perpendicular to the longitudinal axis of the fiber. The cleave angle may increase the core gap that results when two cleaved fibers are butted together in the mechanical splice assembly without regard for the orientation of their cleave angles, which increases attenuation. In addition to these disadvantages, mechanical cleavers require periodic replacement of the cleaver blade and are not conducive to automation due to long-term instability.

It is known to use a focused relatively low-power laser beam to cut an optical fiber or to fuse together a pair of optical fibers. The use of a laser for processing optical fibers is repeatable and conducive to automation. Laser processing of optical fibers is also known to produce an optical fiber endface that is substantially free of defects, as compared to optical fibers that have been mechanically cleaved. Accordingly, it would be desirable to process a stub optical fiber of a field-installable connector using a laser to overcome at least some of the disadvantages described above. In particular, it would be desirable to laser process the stub optical fiber of a field-installable connector to produce a convex endface substantially free of defects and having an edge radius that aids fiber insertion into a mechanical splice assembly, thus minimizing skiving of alignment features. It would also be desirable to laser process the stub optical fiber to thereby minimize the core gap in a mechanical splice, even in applications in which a field prepared fiber has an endface with a slight angle relative to its longitudinal axis. Further, the laser process should expend no consumables and be automation friendly and stable.

BRIEF SUMMARY OF THE INVENTION

To achieve the foregoing and other objects, and in accordance with the purposes of the invention as embodied and broadly described herein, the present invention provides various embodiments of a field-installable connector including a stub optical fiber having an endface that is processed using a laser. The present invention also describes various embodiments of using a laser to cut and shape an endface of an optical fiber in general, and in particular to cut and shape a stub optical fiber of a field-installable connector. The laser processing methods described herein substantially reduce or eliminate a glass defect zone, produce an edge radius that aids fiber insertion into a mechanical splice assembly while minimizing skiving, and produce a generally convex (i.e., dome shaped), endface on a stub optical fiber that minimizes the core gap in a mechanical splice. A laser processed stub optical fiber according to the present invention may replace a mechanically cleaved stub optical fiber in a field-installable connector while solving at least some of the disadvantages described above.

In one exemplary embodiment, the present invention is a field-installable connector comprising a ferrule housing, a ferrule having front and rear opposed faces and at least one fiber bore extending longitudinally therethrough, a stub optical fiber having a laser processed endface disposed within the at least one fiber bore of the ferrule and extending a predetermined distance outwardly beyond the rear face, a ferrule holder, and an alignment feature operable for centering the end of the stub optical fiber and the end of a field optical fiber to produce a mechanical splice. The stub optical fiber and the field optical fiber are brought into end-to-end physical contact and secured in place within the field-installable connector using a securing means. The stub optical fiber having a laser processed endface replaces a mechanically cleaved stub optical fiber in a conventional field-installable connector for producing an improved quality mechanical splice.

In another exemplary embodiment, the field-installable connector may further comprise a biasing element operable for providing float to the ferrule within the connector housing. The field-installable connector may be pre-assembled in the factory and mechanically spliced in the field to a field optical fiber to produce a connectorized optical fiber cable. Prior to assembly, the stub optical fiber may be cut and shaped by rotating the optical fiber while sweeping a laser beam back and forth at a desired angle across the rotating optical fiber. The laser processing is achieved by impinging a predetermined laser energy in the form of a Gaussian intensity distribution onto the surface of the stub optical fiber.

In a further exemplary embodiment, the present invention is a method of fabricating a field-installable connector for use in producing a mechanical splice with a field optical fiber. The method comprises rotating a stub optical fiber secured within a ferrule of the field-installable connector, and laser processing the endface of the stub optical fiber by sweeping a beam of a laser directed at a desired angle from perpendicular to the longitudinal axis of the stub optical fiber, back and forth across the rotating fiber. In one embodiment, the laser is operated in a continuous mode. An oscillating motion of the laser may be driven by an intermittent sinusoidal signal resulting in two deposits of laser energy onto the stub optical fiber followed by a cooling period before the next deposits of laser energy occur. The pulse duration and intensity of the laser energy may be preselected and adjusted so that optical fiber material is progressively ablated without re-depositing the ablated material or distorting the remaining fiber geometry.

In a still further exemplary embodiment, the present invention is a method of laser processing an optical fiber to produce a convex, or dome shaped, endface. The method comprises rotating the optical fiber while sweeping a beam of a laser desired at a preselected angle from perpendicular to the longitudinal axis of the optical fiber back and forth across the rotating optical fiber. As in the embodiment previously described, the laser may be operated in a continuous mode, the oscillating motion of the laser may be driven by an intermittent sinusoidal signal resulting in two deposits of energy onto the optical fiber followed by a cooling period before the next deposits of energy occur, and the pulse duration and the intensity of the laser energy may be predetermined and adjusted so that optical fiber material is progressively ablated without re-depositing the ablated material or distorting the remaining optical fiber geometry. The preselected angle may range from about 10° to about 60°, and more preferably, from about 25° to about 35°. In particular, the laser processing comprises cutting and shaping an optical fiber to create a dome shaped endface having a protruding fiber core.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

Figure 1:
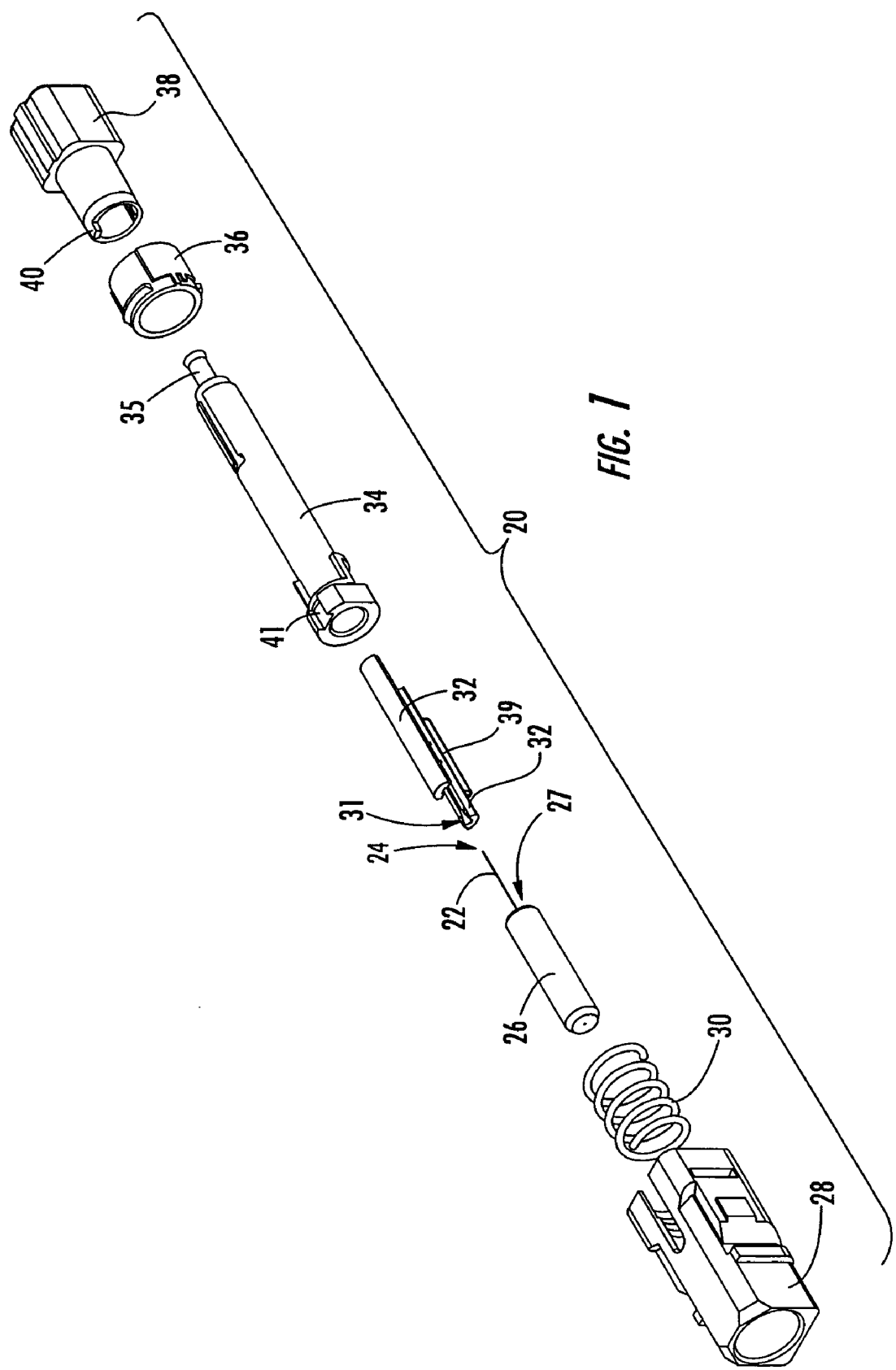
FIG. 1 is an exploded perspective view of a field-installable connector including a stub optical fiber having a laser shaped endface in accordance with an exemplary embodiment of the present invention.

Referring now to the drawings, FIG. 1 shows an exemplary embodiment of a field-installable connector 20 including a stub optical fiber 22 processed using a laser. In particular, the stub optical fiber 22 is cut and the endface 24 of the stub optical fiber 22 is shaped using a laser, such as a focused-beam $CO_2$ laser. The laser processed stub optical fiber 22 may replace a mechanically cleaved stub optical fiber in a field-installable connector. The stub optical fiber 22 may be of any fiber type known in the art, for example, a single-mode or multi-mode optical fiber comprising of a silica-based core and cladding surrounded by an outer coating of UV protective plastic material. The diameter of the inner core region in a single-mode fiber is about 8–10 µm, and in a multi-mode fiber is about 40–50 µm. The cladding region typically has an outer diameter of about 125 µm, and the cladding comprises a lower refractive index than the core region. The outer coating typically has an outer diameter of about 250 µm. In the field, the end portion of a field optical fiber (not shown) to which the connector 20 is to be connected, is inserted into the connector 20 from the end opposite the stub optical fiber 22. The field optical fiber is brought into physical contact with the stub optical fiber 22 and held in place within a mechanical splice assembly, such as the UniCam™ mechanical splice assembly available from Corning Cable Systems LLC of Hickory, N.C. The field-installable connector 20 comprises extremely accurate optical fiber alignment features operable for centering the field optical fiber relative to the stub optical fiber 22.

As shown in the FIG. 1, an SC type field-installable connector 20 comprises a 2.5 mm ferrule 26 at one end of the stub optical fiber 22. The stub optical fiber 22 is secured within a longitudinally extending fiber bore 27 of the ferrule 26 and extends outwardly a predetermined distance beyond the rear face of the ferrule 26, for example from about 2 mm to about 15 mm, more preferably from about 5 mm to about 8 mm. Although a 2.5 mm ferrule 26 and related SC type connector 20 are shown, the ferrule and connector may be any other type including, but not limited to, ST, LC, FC, DC, MTP, MU and MT-RJ. Once secured within the ferrule 26, the stub optical fiber 22 is processed with a laser in a manner that will be described hereinafter. Although the stub optical fiber 22 may be processed with a laser prior to being secured within the ferrule 26, it is preferable to process the stub optical fiber 22 after being secured to more easily and repeatably control the predetermined distance that the stub optical fiber 22 extends beyond the rear face of the ferrule 26. Field-installable connector 20 further comprises a connector housing 28 in which the ferrule 26 resides. A biasing element, such as a compression spring 30, is operable for permitting the ferrule 26 to float longitudinally within the connector housing 28. Limitations on the extent of the float of the ferrule 26 are determined by various factors, such as the amount of compression available from the compression spring 30 and the force required to compress the compression spring 30.

Figure 2:
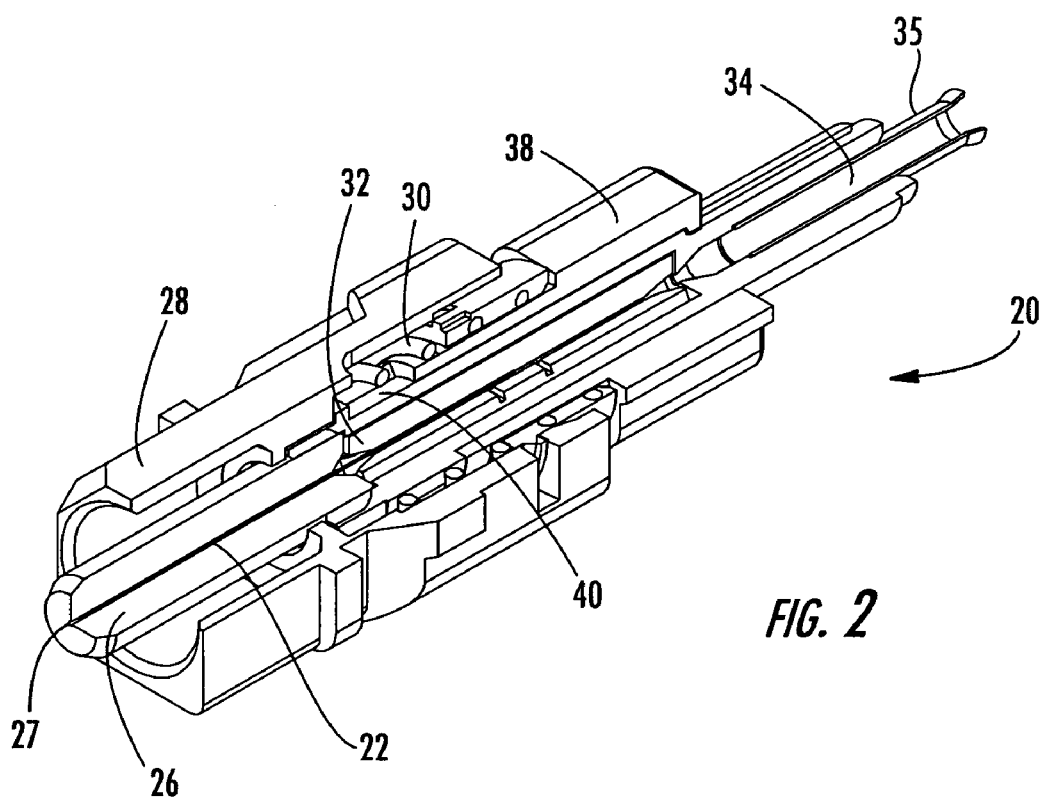
FIG. 2 is a cut-away perspective view of the connector of FIG. 1 shown in its assembled configuration.

Referring to FIG. 2, the laser processed stub optical fiber 22 disposed within the ferrule 26 is inserted into a lengthwise extending alignment feature, for example a V-groove 31 (FIG. 1), defined by splice parts 32. In FIG. 1, the splice parts 32 are shown in a staggered configuration for purposes of clarity. The stub optical fiber 22 and the field optical fiber are brought into physical contact, end-to-end, within the splice parts 32. A substantially hollow ferrule holder 34 is provided for housing the splice parts 32. The ferrule holder 34 defines a lead-in tube 35 operable for guiding the field optical fiber into the ferrule holder 34 and between the splice parts 32. A collar 36 is positioned around the ferrule holder 34. A camming mechanism 38 defines a protrusion 40 that locks into a slot 41 provided on the forward end of the ferrule holder 34.

Referring to FIG. 2, the field-installable connector 20 is shown in its factory assembled configuration. Although not shown, the field optical fiber would be inserted into the opening defined by the lead-in tube 35 of the ferrule holder 34 and secured between the splice parts 32. The camming mechanism 38 is operable for applying pressure to a keel 39 (FIG. 1) of the splice parts 32 in order to compress the splice parts 32 radially inward, as will be described. Once the stub optical fiber 22 and the field optical fiber have been brought into physical contact, the camming mechanism 38 is rotated, which in turn applies the compressive force to the keel 39 of the splice parts 32. Once the mechanical splice is produced, the field-installable connector 20 secures the stub optical fiber 22 and the field optical fiber in place. While the stub optical fiber 22 is laser processed, the field optical fiber is typically mechanically cleaved using conventional cleaving techniques. The field-installable connector 20 may be pre-assembled in the factory and mechanically spliced in the field to the field optical fiber to create a connectorized optical fiber cable. Although not shown, a rubber boot may be positioned over the rear of the connector 20 following assembly. The boot is operable for protecting and sealing the connector 20 and the mechanical splice from the environment, and/or limiting the bend radius of the field optical fiber extending rearwardly from the connector 20.

Figure 3:
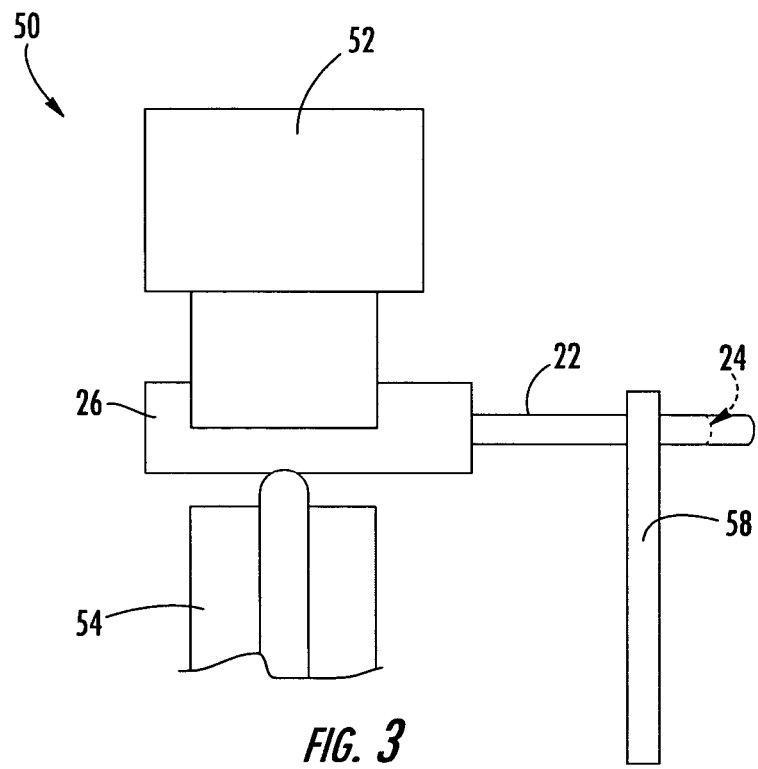
FIG. 3 is a schematic diagram illustrating a stub optical fiber and ferrule assembly processed with a focused, relatively low-energy laser in accordance with an exemplary embodiment of the present invention.

Referring to FIG. 3, a schematic diagram illustrating an assembly 50 for rotating the ferrule 26 and consequently, the stub optical fiber 22 is shown. To provide for rotation of the stub optical fiber 22 about its longitudinal axis, the ferrule 26 is positioned between a stationary ferrule support 52 defining an inverted V-groove (not shown) and a suitable spinning mechanism 54, such as a servo driven wheel or rotor. The stationary ferrule support 52 is representative of any known means operable for preventing upwards or sideways movement of the ferrule 26 during rotation. The spinning mechanism 54 is representative of any known means operable for rotating the ferrule 26 and the stub optical fiber 22 about the longitudinal axis of the ferrule 26, which at least in theory is coincident with the longitudinal axis of the stub optical fiber 22. The stationary ferrule holder 52 should provide support, without undue friction. In one example, the ferrule 26 is rotated at a rate of about 2 Hz. The free end of the stub optical fiber 22 is preferably supported by a second stationary support 58 comprising a V-groove (not shown) to minimize the effects of run-out during laser processing of the stub optical fiber 22. The portion of the stub optical fiber 22 protruding beyond the second stationary support 58 should be sufficiently long to permit laser processing the optical fiber 22, as will be described in greater detail below, yet not long enough to result in a significant eccentricity of rotation of the portion being cut and shaped.

Figure 4:
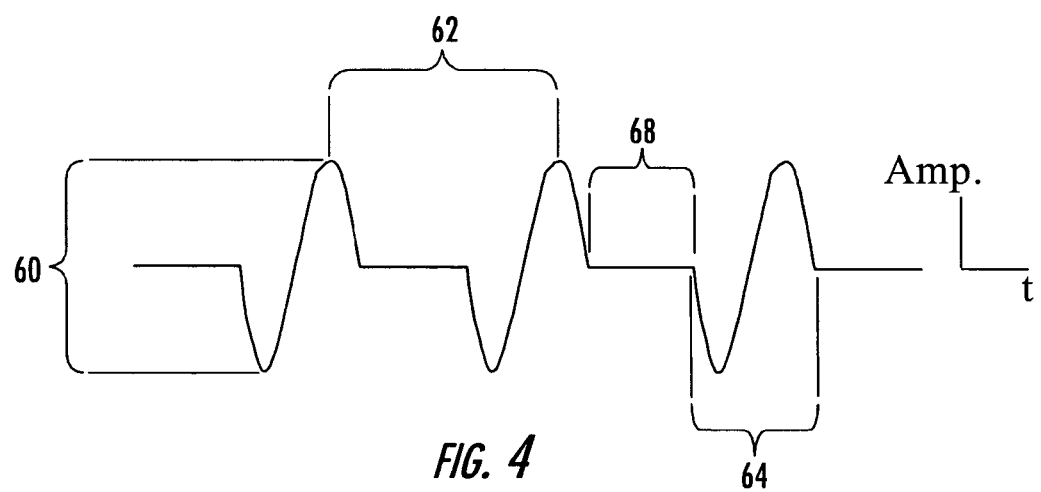
FIG. 4 is a graphic illustration of an intermittent sinusoidal signal that controls the path of a laser during processing of an optical fiber in accordance with an exemplary embodiment of the present invention.

In an exemplary method of laser processing the stub optical fiber 22, a laser beam is swept back and forth across the surface while the stub optical fiber 22 is rotating. The energy from a commercially available $CO_2$ laser, such as a 150-watt maximum sealed tube $CO_2$ laser available from SYNRAD Inc. of Mukilteo, Wash., is focused to a spot of about a 200 µm diameter. In one embodiment, the laser may be focused to a spot slightly larger than the diameter of the stub optical fiber 22. The laser may be operated in a continuous mode at a frequency of about 20 kHz. Referring to FIG. 4, the oscillating motion of the laser may be driven by an intermittent sinusoidal signal that controls the path of the laser during processing. The frequency of the intermittent sinusoidal signal may be about 24 Hz, while the burst frequency may be about 12 Hz. The peak-to-peak amplitude of the sinusoidal signal is illustrated by reference numeral 60. The period of the burst frequency (i.e., the time required to complete one full cycle of the laser processing) is illustrated by reference numeral 62. The period of the sinusoidal signal frequency that controls the sweep of the laser (i.e., the time required to complete one full cycle of the laser sweep) is illustrated by reference numeral 64. The period of the dwell frequency (i.e., the time between successive laser sweeps) is illustrated by reference numeral 68. The period of the dwell frequency is also equal to the period of the burst frequency minus the period of the sinusoidal signal frequency.

Figure 5:
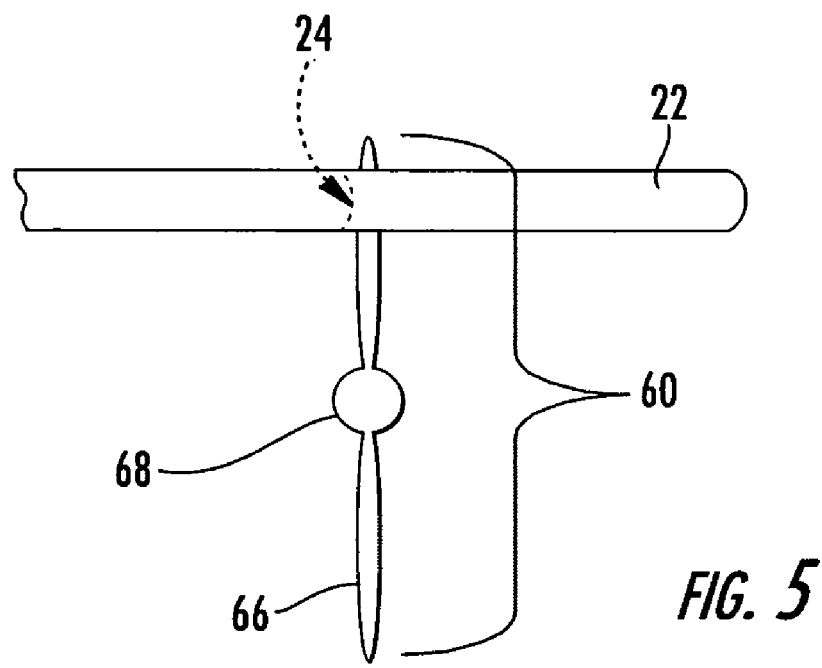
FIG. 5 is a schematic diagram illustrating the position of an optical fiber relative to a laser path in accordance with an exemplary embodiment of the present invention.

FIG. 5 is a schematic diagram illustrating the position of the stub optical fiber 22 relative to the sweep path 60 of the laser. In one embodiment, the stub optical fiber 22 may be located from about 2 to about 2.5 fiber widths downward from the uppermost peak of the sinusoidal laser path, and about 8 to about 10 fiber widths upward from the null, or dwell, position 68 of the laser. This positioning produces two deposits of energy onto the stub optical fiber 22 followed by a cooling period before the next deposits of energy are applied. The burn mark of the laser is illustrated by reference numeral 66 and the cooling period of the laser sweep is illustrated by reference numeral 68. The peak-to-peak amplitude of the laser sweep is also illustrated by reference numeral 60 in FIG. 5.

Laser processing is achieved by impinging an amount of laser energy at the predetermined laser intensity, in the form of a Gaussian intensity distribution, onto the stub optical fiber 22. Upon contact with the stub optical fiber 22, the radiation of the $CO_2$ laser is absorbed primarily at the outer surface of the fiber. The silica (i.e., glass) at the surface of the stub optical fiber 22 is raised above its vaporization temperature and is ablated away while heat is conducted into the material of the stub optical fiber 22. The longer the time the laser is maintained at the surface, the greater is the resulting depth penetration of the heat generated by the laser. Therefore, short, intense pulses may be used to cause ablation of the surface cladding with minimal melting of the underlying material. The pulse duration and energy intensity of the laser beam are preselected and periodically adjusted so that the optical fiber material of the stub optical fiber 22 is progressively ablated without re-depositing the ablated material or distorting the remaining optical fiber geometry. The laser processing methods disclosed herein permit an operator to produce an endface 24 on the stub optical fiber 22 while controlling the shape of the endface.

Preferably, the laser is swept in an oscillating motion across the stub optical fiber 22 to achieve ablation of the fiber material, while minimizing overheating from thermal energy in the non-ablated region. The process described herein may produce a slight flare to the outer diameter of the stub optical fiber 22. The impact of this flare is insignificant in the end product due to the fact that the mechanical splice assembly V-grooves may be a molded composite material that yields when clamped around the stub optical fiber 22. A convex, or dome shaped, endface with excellent symmetry is achieved by rotating the stub optical fiber 22 while pulsing the laser. In the case of a stationary stub optical fiber 22, a dome shaped endface with elongated symmetry may result. In either case, the endface of the stub optical fiber 22 optimally comprises a dome shaped endface with a slightly protruding optical fiber core.

Figure 6:
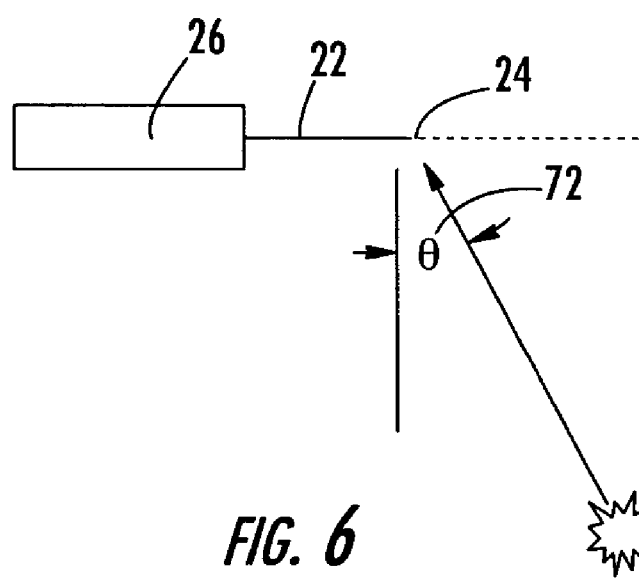
FIG. 6 is a schematic diagram illustrating a desired orientation of a laser in relation to an optical fiber processed in accordance with an exemplary embodiment of the present invention.

FIG. 6 is a schematic diagram illustrating an exemplary orientation of the laser in relation to the stub optical fiber 22. The beam from a laser source 70 may be directed in the direction of the ferrule 26 at a desired angle θ (i.e., 72) from about 10° to about 60° from perpendicular to the longitudinal axis of the stub optical fiber 22 so that the laser beam impinges the desired endface 24 of the stub optical fiber 22. In a preferred embodiment, the angle 72 may range from about 20° to about 45° from perpendicular to the longitudinal axis of the stub optical fiber 22. In a more preferred embodiment, the angle 72 may range from about 25° to about 35° from perpendicular to the longitudinal axis of the stub optical fiber 22. The angle 72 is desired to overcome the approximate Gaussian energy distribution across the diameter of the laser beam. The angle 72 may be adjusted to produce a slightly dome shaped endface 24 of the stub optical fiber having a core protrusion of about 2 μm to about 3 μm. Due to heating and ablation effects, the endface 24 of the stub optical fiber 22 may have about a 5 μm to about 10 μm radius, which aids insertion of the stub optical fiber 22 into the alignment feature (i.e., a composite V-groove) of the mechanical splice assembly. By producing a stub optical fiber 22 having a dome shaped endface 24, the optical fiber core leads the cladding material of the stub optical fiber 22. The protruding optical fiber core decreases the fiber core gap when the stub optical fiber 22 and the field optical fiber are butted together within the alignment feature of the mechanical splice assembly.

In an alternative embodiment, another exemplary method for processing the endface 24 of a stub optical fiber 22 comprises fixing the position of the laser beam (i.e., no sweeping motion) and rotating the stub optical fiber 22. The laser may be pulsed at a frequency from about 8 Hz to about 12 Hz with a short pulse width in the micro-second range. The desired angle 72 between the beam of the laser and the stub optical fiber 22 may be within the ranges described previously. The most important parameter in this embodiment is the location of the stub optical fiber 22 relative to the focal point of the laser beam. The positional relationship should be both accurate and repeatable. Although this process may produce similar results to the process described previously, automating the process is somewhat more difficult.

In another exemplary embodiment, the stub optical fiber 22 may be fixed in position (i.e., not rotated), and the laser beam may be swept across the fiber in the manner previously described. The laser may be run in a continuous mode and the sweeping parameters of the laser beam may also be the same as previously described. In one example, the laser may be placed up to about a meter or more from the stub optical fiber 22 to allow the beam to become more organized and the beam geometry more predictable. The accuracy and repeatability of the angle 72 of the laser beam with respect to the longitudinal axis of the stub optical fiber 22 is most important in achieving an acceptable result. The angle 72 may depend on the characteristics of the laser beam, including its cross-sectional energy profile. A conventional galvanometer and external drive may be used to sweep the laser beam while holding the stub optical fiber 22 stationary. Galvanometers are typically used in laser marking heads for sweeping the laser beam in 2 dimensions. The galvanometer (not shown) may be placed into the setup in conjunction with an IR scanning (F-theta) lens (not shown) to sweep the laser beam in the horizontal direction. A stepper motor (not shown) may still be used for positioning, without rotating, the ferrule 26 and the stub optical fiber 22. This stationary stub optical fiber 22 and laser beam sweep approach may also permit angles to be formed on the endface 24 of the stub optical fiber 22. Ribbon fibers may also benefit from this setup and laser processing method.

The laser cutting and shaping methods of the present invention may be used to shape an individual optical fiber as well as a plurality of optical fibers oriented parallel to each other, for example the multiple fibers of an MT-RJ ferrule or a ribbon cable. The laser shaping process results in each optical fiber of the plurality of optical fibers having substantially the same dome shaped endface having a protruding optical fiber core. The laser process generates a generally convex endface having a radius from about 2 mm to about 20 mm, which minimizes the core gap in a mechanical splice even in situations in which a field optical fiber is cleaved at a slight angle. In addition, the laser process generates a convex endface, which aids insertion of the optical fiber(s), for example, into the V-groove 31 of the mechanical splice assembly previously described, while minimizing skiving. The laser cutting and shaping process of the present invention does not generate a microlens as described in U.S. Pat. No. 4,932,989, which would require both the cutting away of cladding material and melting the fiber core of the endface to form a lens curvature.

In an exemplary embodiment for fiber processing automation, the process may comprise the steps of: (1) loading a plurality of ferrules 26 into a pallet; (2) stripping each stub optical fiber 22; (3) inserting epoxy into each ferrule bore 27; (4) tacking the stub optical fiber 22 within the corresponding bore 27 of the ferrule 26; (5) cutting the stub optical fiber 22 to a predetermined length greater than the desired length of the finished stub optical fiber 22; (6) curing the epoxy; (7) laser scribing the stub optical fiber 22 close to the ferrule 26; (8) laser cutting and/or shaping the stub optical fiber 22 to produce a dome shaped endface 24; (9)

inserting the ferrule 26 and the stub optical fiber 22 into a ferrule holder 34 and mechanical splice assembly 32; (10) inserting epoxy and curing; (11) inserting index-matching gel; (12) performing a hardware installation sequence depending on connector type; and (13) performing a sample end-line test. In alternative embodiments, either of the epoxy steps may be replaced by ultrasonic welds and/or press fits.

Experimental results: A laser cut-off station was used to process an optical fiber. An SC ferrule with about 2 mm of the ferrule ground away and a dry fiber running through the ferrule was used. The optical fiber was secured to the rear of the ferrule. A function generator was used to create a square-wave and control the pulse width of the laser. This allowed the laser to be fired for just one pulse. The optical fiber was impinged with a pulse of light at 0°, 90°, 180° and 270°. The pulse width was varied and it was found that the endface geometry can be controlled by the width of the pulse while holding all other variables constant. The amount of radial angle that the fiber was rotated was also varied before re-firing the laser. Tests were conducted firing the laser at 0°, 45°, 90°, 135°, 180°, 225°, 270° and 315° around the fiber. As the incremental angular value was decreased, the geometry of the fiber endface flattened in shape. Firing the laser at 0° and 180° created a wedge-shaped geometry endface. More control over the geometry of the endface was obtained by accurately supporting and rotating the optical fiber.

The process described above was used to produce an endface surface within +/−0.50° perpendicular to the axis of the optical fiber, and to place a round, or chamfer, along the edge of the fiber. In the preferred embodiment for laser processing a single optical fiber, the fiber was rotated while the cutting/shaping took place due to alignment issues. A small length of the optical fiber was placed in a ferrule supported by a V-groove. A stepper motor was controlled using a programmable logic controller (PLC). The end of the optical fiber protruded beyond a fiber support. The optical fiber was positioned at a preselected angle relative to the incoming pulsed laser beam. In one example, the ferrule was rotated at a rate of about 3 rev/second while the laser was pulsed at about 24 Hz with a pulse width of about 0.35 milliseconds. The ferrule completed about 20 revolutions during the laser processing. The resultant length of the optical fiber after laser processing was about 6 mm from the rear face of the ferrule. In one example, the laser used was a 50-watt $CO_2$ laser available from SYNRAD (model number 48-5). A 25-watt laser was also tested and found satisfactory for laser processing the optical fiber. The 50-watt laser operated at a 10.6 μm wavelength (mid-infrared) and was randomly polarized. The energy distribution in a cross-section of the beam was approximately Gaussian ($TEM_{00}$) with 95% purity. To the naked eye, the end of the optical fiber after laser processing appeared relatively flat.

Figure 7:
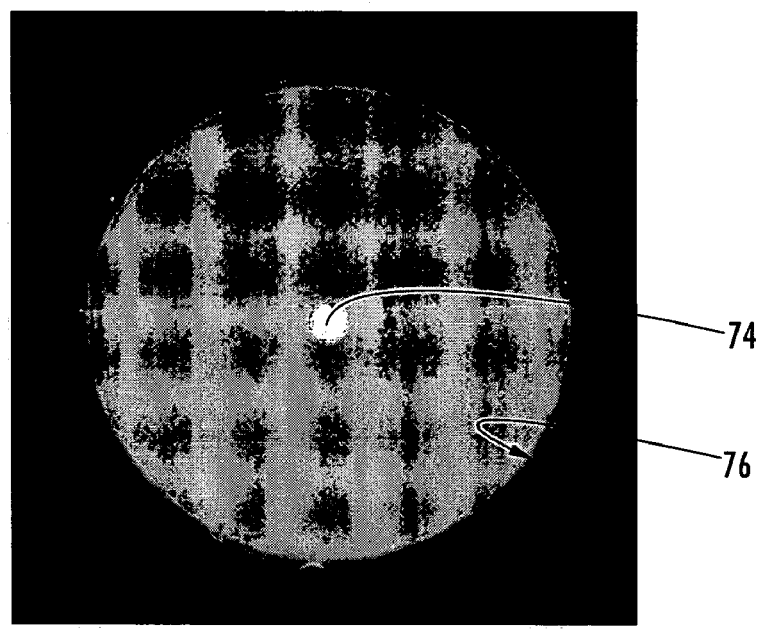
FIG. 7 is a magnified digital image of the endface of an optical fiber processed in accordance with an exemplary embodiment of the present invention and shown with light transmitted through the fiber core.
Figure 8:
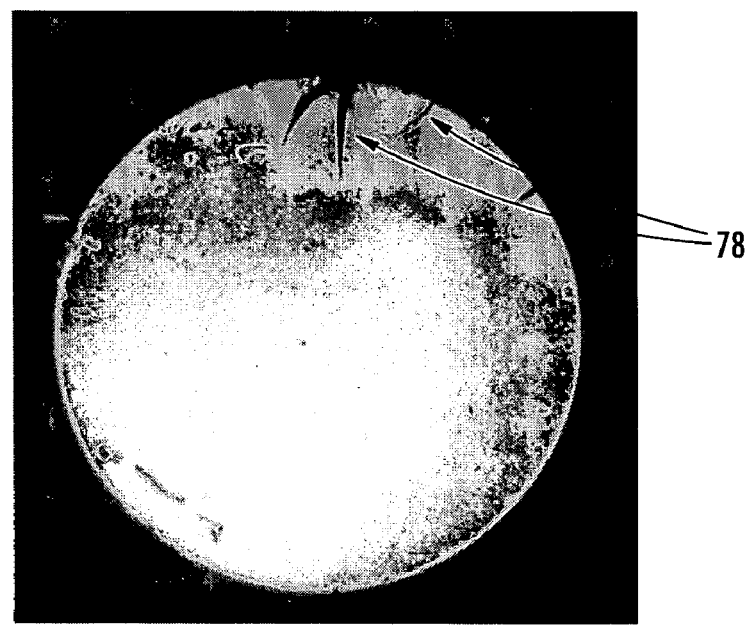
FIG. 8 is a magnified digital image of the endface of an optical fiber mechanically cleaved in accordance with the prior art.

Referring to FIG. 7, when viewed under digital magnification, the endface of the optical fiber included a rise in the core 74 of about 2 μm. The radius on the edge 76 of the fiber was about 5 μm. In contrast, an optical fiber cleaved using a conventional mechanical cleaving technique is shown in FIG. 8. When viewed under digital magnification, defects 78 in the outer cladding region can be seen around the outer diameter of the optical fiber. The defects 78 were more pronounced at the location at which the mechanical cleaving blade made initial contact with the optical fiber.

The optical fiber processing methods and field-installable connector described above provide factory-produced assemblies that simplify conventional mechanical splicing in the field. Since no epoxy or crimps are needed to maintain the splice, the splice is not permanent and may be disassembled. A mechanical cleaver is not required to process the stub optical fiber, and field splicing is achieved without special fixtures or tools. Splicing may be accomplished one fiber at a time in applications in which multiple fibers are involved.

The foregoing is a description of various embodiments of the invention that are provided here by way of example only. Although the field-installable connector and method of laser processing a stub optical fiber have been described with reference to preferred embodiments and examples thereof, other embodiments and examples may perform similar functions and/or achieve similar results. All such equivalent embodiments and examples are within the spirit and scope of the present invention and are intended to be covered by the appended claims.

What is claimed is:

1. A method of fabricating a field-installable connector adapted to be mechanically spliced to a field optical fiber, comprising:
   rotating a stub optical fiber secured within a ferrule of the field-installable connector; and
   laser processing the stub optical fiber to create an endface by sweeping a laser beam directed at a preselected angle from perpendicular to a longitudinal axis of the stub optical fiber back and forth across a surface of the rotating stub optical fiber.

2. The method of claim 1;
   wherein an oscillating motion of the laser is driven by an intermittent sinusoidal signal resulting in at least one deposit of energy onto the stub optical fiber followed by a cooling period before a subsequent deposit of energy occurs; and
   wherein a pulse duration and a laser energy are predetermined so that the stub optical fiber is progressively ablated without re-depositing ablated material or distorting the geometry of the remaining stub optical fiber.

3. The method of claim 1, wherein the preselected angle ranges from about 10° to about 60° from pependicularto the longitudinal axis of the stub optical fiber.

4. The method of claim 1, wherein the preselected angle ranges from about 25° to about 35° from perpendicular to the longitudinal axis of the stub optical fiber.

5. The method of claim 1, wherein the laser is focused to a spot size that is slightly larger than the diameter of the stub optical fiber.

6. The method of claim 1, wherein the stub optical fiber is positioned from about 2 to about 2.5 fiber widths downward from an uppermost peak of a sinusoidal laser path and about 8 to about 10 fiber widths upward from a dwell position of the laser.

7. The method of claim 1, wherein the step of laser processing the stub optical fiber is achieved by impinging an amount of laser energy at a preselected laser intensity in the form of a Gaussian intensity distribution onto the stub optical fiber.

8. The method of claim 1, wherein the step of laser processing the stub optical fiber creates a dome shaped endface having a protruding fiber core.

9. A method of laser processing an optical fiber, comprising;
   rotating the optical fiber; and
   sweeping a beam of a laser directed at a preselected angle from perpendicular to a longitudinal axis of the optical fiber back and forth across a surface of the rotating optical fiber;
   wherein the laser is operated in a continuous mode;
   wherein an oscillating motion of the laser is driven by an intermitting sinusoidal signal resulting in two deposits of energy onto the optical fiber followed by a cooling period before subsequent deposits of energy occur; and wherein a pulse duration and an energy intensity of the laser are preselected so that the optical fiber is progressively ablated without re-depositing ablated material or distorting the geometry of the remaining optical fiber.

10. The method of claim 9, wherein the preselected angle ranges from about 10° to about 60°.

11. The method of claim 9, wherein the preselected angle ranges from about 25° to about 35°.

12. The method of claim 9, wherein the step of sweeping a laser creates a dome shaped endface having a protruding fiber core on the optical fiber.

* * * * *

UNITED STATES PATENT AND TRADEMARK OFFICE
CERTIFICATE OF CORRECTION

PATENT NO. : 7,216,512 B2  Page 1 of 1
APPLICATION NO. : 10/698220
DATED : May 15, 2007
INVENTOR(S) : Danley et al.

It is certified that error appears in the above-identified patent and that said Letters Patent is hereby corrected as shown below:

| No. | Col. | Line | Description |
|---|---|---|---|
| 1 | 10 | 37 | Delete "perpendicularto"; replace with --perpendicular to--. |

Signed and Sealed this

Twenty-ninth Day of April, 2008

JON W. DUDAS
*Director of the United States Patent and Trademark Office*